United States Patent
Oda et al.

(10) Patent No.: US 12,234,906 B2
(45) Date of Patent: Feb. 25, 2025

(54) DIFFERENTIAL DEVICE

(71) Applicant: MUSASHI SEIMITSU INDUSTRY CO., LTD., Toyohashi (JP)

(72) Inventors: Hirohisa Oda, Toyohashi (JP); Akuto Sekiguchi, Toyohashi (JP)

(73) Assignee: Musashi Seimitsu Industry Co., Ltd., Aichi (JP)

(*) Notice: Subject to any disclaimer, the term of this patent is extended or adjusted under 35 U.S.C. 154(b) by 0 days.

(21) Appl. No.: 18/036,984

(22) PCT Filed: Nov. 17, 2020

(86) PCT No.: PCT/JP2020/042850
§ 371 (c)(1),
(2) Date: May 15, 2023

(87) PCT Pub. No.: WO2022/107223
PCT Pub. Date: May 27, 2022

(65) Prior Publication Data
US 2024/0019027 A1    Jan. 18, 2024

(51) Int. Cl.
*F16H 57/04*    (2010.01)

(52) U.S. Cl.
CPC ..... *F16H 57/0483* (2013.01); *F16H 57/0421* (2013.01); *F16H 57/0423* (2013.01); *F16H 57/0424* (2013.01)

(58) Field of Classification Search
CPC ............ F16H 57/0421; F16H 57/0423; F16H 57/0424

(Continued)

(56) References Cited

U.S. PATENT DOCUMENTS

| 4,018,097 A * | 4/1977 | Ross .................. F16H 57/0483 184/6.12 |
| 6,743,136 B1 * | 6/2004 | Jensen ............... F16H 57/0427 475/160 |

(Continued)

FOREIGN PATENT DOCUMENTS

| JP | 2008-128265 A | 6/2008 |
| JP | 2009-127707 A | 6/2009 |

(Continued)

OTHER PUBLICATIONS

The International Search Report, PCT/ISA/210, of International Application PCT/JP2020/042850, with the English translation thereof.

(Continued)

*Primary Examiner* — Colby M Hansen
(74) *Attorney, Agent, or Firm* — Carrier, Shende & Associates P.C.; Joseph P. Carrier; Fulchand P. Shende

(57) ABSTRACT

A differential device includes a differential case having an inner surface with an oil introducing part. The oil introducing part is located between, in an axial direction, a corresponding one side gear support surface and at least a part of a circumferential rim of a window in a circumferential direction. The oil introducing part at least partially protrudes from the inner surface toward a first axial line so as to guide oil such that the oil deviates from a flow direction from the corresponding one side gear support surface to the window along the inner surface and flows around the window.

8 Claims, 9 Drawing Sheets

(58) Field of Classification Search
USPC .......................................................... 475/160
See application file for complete search history.

(56) References Cited

U.S. PATENT DOCUMENTS

| | | | | |
|---|---|---|---|---|
| 8,475,314 B2* | 7/2013 | Corless | ............... | F16H 57/0483 |
| | | | | 184/6.12 |
| 9,127,760 B1* | 9/2015 | Potter | ................. | F16H 57/0409 |
| 9,476,493 B2* | 10/2016 | Yanase | .................... | F16H 48/40 |
| 2006/0084546 A1* | 4/2006 | Kohno | ............... | F16H 57/0483 |
| | | | | 475/160 |
| 2007/0225103 A1* | 9/2007 | Veldman | ............. | F16H 57/0483 |
| | | | | 475/160 |
| 2008/0051244 A1* | 2/2008 | Nakajima | ........... | F16H 57/0483 |
| | | | | 475/160 |
| 2008/0108471 A1* | 5/2008 | Deutsch | .............. | F16H 57/0483 |
| | | | | 475/331 |
| 2012/0295751 A1* | 11/2012 | Okada | ................ | F16H 57/0483 |
| | | | | 475/160 |
| 2015/0087461 A1* | 3/2015 | Jackson | .................. | F16H 48/38 |
| | | | | 475/160 |
| 2016/0377164 A1* | 12/2016 | Fast | .................... | F16H 57/0483 |
| | | | | 475/160 |
| 2022/0349464 A1 | 11/2022 | Fukasawa et al. | | |

FOREIGN PATENT DOCUMENTS

| | | |
|---|---|---|
| JP | 2019-183871 A | 10/2019 |
| JP | 6625778 B1 | 12/2019 |

OTHER PUBLICATIONS

The IPRP & Written Opinion of the International Searching Authority, regarding International Application PCT/JP2020/042850, Forms PCT/IB/338, PCT/IB/373 and PCT/ISA/237.

Office Action, Notice of Reasons for Refusal, issued on Jan. 9, 2024 in the corresponding Japanese Patent Application No. 2022-563288 and the English machine translation thereof.

* cited by examiner

DIFFERENTIAL DEVICE

TECHNICAL FIELD

The present invention relates to a differential device, in particular, a differential device comprising: a differential case rotatable about a first axial line; side gears in pairs supported by the differential case in a freely rotatable manner about the first axial line; two or more pinion gears supported by the differential case in a freely rotatable manner about at least one second axial line orthogonal to the first axial line and meshing with the respective side gears in pairs; a boss part protruding from a side part of the differential case on at least one side of the differential case in an axial direction along the first axial line; and a window formed in the differential case to allow communication between an inside and an outside of the differential case.

BACKGROUND ART

The differential device described above has been conventionally known as disclosed in, for example, Patent Document 1.

There is also a conventionally known oil introduction structure to provide, in a differential device in which side gears and pinion gears are housed in a differential case in a freely rotatable manner, a boss part of the differential case with an oil introduction channel capable of introducing oil from the outside of the differential case into an oil groove in a side gear support surface.

PRIOR ART DOCUMENTS

Patent Documents

Patent Document 1:
Japanese Unexamined Patent Application Publication No. 2008-128265

SUMMARY OF THE INVENTION

Problems to be Solved by the Invention

In the differential device of Patent Document 1, a window is provided with lips for holding lubricating oil at front and rear circumferential rims thereof in a rotating direction of a differential case. The lips protrude so as to inhibit oil introduced into the differential case from flowing toward and flowing out of the window of the differential case due to action of a centrifugal force resulting from rotation of the differential case.

A lip structure as above can inhibit the oil flowing on the inner surface of the differential case in the rotating direction from flowing out of the window. However, the lip structure cannot inhibit the oil flowing on the inner surface of the differential case in an axial direction from flowing out of the window.

Thus, there arises a problem that, if the conventionally known oil introduction structure above is applied to the differential device of Patent Document 1, there is a greater ratio of the oil to be introduced into the differential case through the side gear support surface and flow on the inner surface of the differential case in the axial direction of the inner surface of the case, and the oil is prone to flow out of the differential case through the window.

The present invention is made in light of circumstances discussed above, and has an object to provide a differential device that can solve the above problem with a simple structure.

Means for Solving the Problems

In order to achieve the above-described object, the present invention has a first feature to provide a differential device. The differential device comprises a differential case, side gears in pairs, two or more pinion gears, a boss part, an oil introduction channel, and a window. The differential case is rotatable about a first axial line. The side gears in pairs are supported by the differential case in a freely rotatable manner about the first axial line. The two or more pinion gears are configured to (i) be supported by the differential case in a freely rotatable manner about at least one second axial line orthogonal to the first axial line and (ii) mesh with the respective side gears in pairs. The boss part is provided to a side part of the differential case in a protruding manner. The side part is located on at least one side of the differential case in an axial direction along the first axial line. The oil introduction channel is provided to the boss part. The oil introduction channel is configured to introduce lubricating oil from an outside of the differential case to a corresponding one side gear support surface of side gear support surfaces in an inner surface of the differential case. The corresponding one side gear support surface is configured to support a back side of a corresponding one side gear of the side gears such that the corresponding one side gear freely rotates. The corresponding one side gear is located on the same side of the differential case as the boss part. The window is formed in the differential case so as to make an inside and the outside of the differential case communicate with each other. The inner surface of the differential case includes an oil guiding part. The oil guiding part is located between, in the axial direction, the corresponding one side gear support surface and at least a part of a circumferential rim of the window in a circumferential direction. The oil guiding part at least partially protrudes from the inner surface toward the first axial line so as to guide at least some of oil such that the at least some of the oil deviates from a flow direction from the corresponding one side gear support surface to the window along the inner surface and flows around the window.

In addition to the first feature, the present invention has a second feature in which a pinion gear lubricating oil groove is provided in a corresponding one pinion gear support surface of pinion gear support surfaces that are provided in the inner surface of the differential case and supporting back sides of the respective two or more pinion gears such that the two or more pinion gears freely rotate. The pinion gear lubricating oil groove is open to the inner surface of the differential case at an outer circumference of the corresponding one pinion gear support surface.

In addition to the second feature, the present invention has a third feature in which each side gear support surface of the side gear support surfaces is formed in an annular planar surface orthogonal to the first axial line. The inner surface of the differential case comprises a diameter-enlarged inner surface part coupling the side gear support surfaces in pairs to each other and having a diameter enlarged relative to the each side gear support surface. The diameter-enlarged inner surface part includes an inner surface bottom part farthest from the first axial line in the diameter-enlarged inner surface part. Between the inner surface bottom part and the window, the inner surface of the differential case is provided with a weir protruding toward the first axial line with respect to the inner surface bottom part. The weir is at least a part of the oil guiding part. The pinion gear lubricating oil groove is open to the inner surface bottom part.

In addition to the first feature, the present invention has a fourth feature in which, on respective support bases provided in a protruding manner to the inner surface of the differential case, pinion gear support surfaces are formed to support respective back sides of the two or more pinion gears such that the two or more pinion gears freely rotate. A pinion gear lubricating oil groove provided in a corresponding one pinion gear support surface of the pinion gear support surfaces includes an opened part open to an outer circumference of a corresponding one support base of the support bases. The inner surface of the differential case includes an inner diameter changing part and an auxiliary weir. In an axial range from the corresponding one side gear support surface on one side of the differential case in the axial direction to at least the opened part, the inner diameter changing part has a diameter enlarged as the inner diameter changing part extends toward another side of the differential case in the axial direction. The auxiliary weir is provided in a protruding manner to an inner surface of the inner diameter changing part. The auxiliary weir extends from a part of the outer circumference of the corresponding one support base, closer to the other side of the differential case in the axial direction with respect to the opened part, toward the window.

Effects of the Invention

According to the first feature of the present invention, the inner surface of the differential case rotatable about the first axial line includes the oil guiding part located between, in the axial direction, the corresponding one side gear support surface and the at least the part of the circumferential rim of the window in the circumferential direction. The oil guiding part at least partially protrudes from the inner surface toward the first axial line so as to guide the at least some of the oil such that the at least some of the oil deviates from a flow direction from the corresponding one side gear support surface to the window along the inner surface and flows around the window. Even when there is a greater ratio of oil flowing on the inner surface of the differential case through the corresponding one side gear support surface in the axial direction due the oil being guided into the differential case from the oil introduction channel of the boss part through the corresponding one side gear support surface, the oil flowing in the axial direction can be guided by the aforementioned oil guiding part so as to flow around the window. This can suppress outflow of the oil through the window and keep the oil on the inner surface of the differential case.

According to the second feature, the pinion gear lubricating oil groove is provided in the corresponding one pinion gear support surface that is provided in the inner surface of the differential case. The pinion gear lubricating oil groove is open to the inner surface of the differential case at the outer circumference of the corresponding one pinion gear support surface. Thus, the aforementioned oil guiding part can effectively supply the oil kept on the inner surface of the differential case to the pinion gear lubricating oil groove. Accordingly, the corresponding one pinion gear support surface can be efficiently lubricated.

According to the third feature, each side gear support surface is formed in the annular planar surface orthogonal to the first axial line. The inner surface of the differential case comprises the diameter-enlarged inner surface part coupling the side gear support surfaces in pairs to each other and has the diameter enlarged relative to each side gear support surface. The diameter-enlarged inner surface part includes an inner surface bottom part farthest from the first axial line in the diameter-enlarged inner surface part. In this regard, the oil introduced from the oil guiding part through the corresponding one side gear support surface flows along the aforementioned diameter-enlarged inner surface part under a centrifugal force and is easily accumulated in the inner surface bottom part of the diameter-enlarged inner surface part. Particularly, due to the corresponding one side gear support surface being the annular planar surface and extending radially outward, an area having an enlarged diameter (that is, deeper radially outward) can be widely obtained in the inner surface of the differential case in the axial direction, as compared to a case where the corresponding one side gear support surface itself has a structure in which the diameter is gradually enlarged from an inner circumferential end to an outer circumferential and thereof (for example, a differential case structure in which the side gear support surface is formed into a spherical shape or tapered shape). Thus, a large amount of the oil can be stored in the inner surface bottom part of the diameter-enlarged inner surface part. Between the inner surface bottom part and the window, the inner surface of the differential case is provided with the weir protruding toward the first axial line with respect to the inner surface bottom part. The pinion gear lubricating oil groove is open to the inner surface bottom part. A large amount of oil accumulated in the inner surface bottom part can be sufficiently supplied to the pinion gear lubricating oil groove. Accordingly, the pinion gear support surfaces can be efficiently lubricated.

According to the fourth feature, on the respective support bases provided in a protruding manner to the inner surface of the differential case, the pinion gear support surfaces are formed to support the respective back sides of the two or more pinion gears such that the two or more pinion gears freely rotate. The pinion gear lubricating oil groove provided in the corresponding one pinion gear support surface includes the opened part open to the outer circumference of the corresponding one support base. The inner surface of the differential case includes the inner diameter changing part and the auxiliary weir. In the axial range from the corresponding one side gear support surface on the one side of the differential case in the axial direction to the at least opened part, the inner diameter changing part has a diameter enlarged as the inner diameter changing part extends toward the other side of the differential case in the axial direction. The auxiliary weir is provided in a protruding manner to the inner surface of the inner diameter changing part and extends from the part of the outer circumference of the corresponding one support base, closer to the other side of the differential case in the axial direction with respect to the opened part, toward the window. With the fourth feature, the oil introduced into the differential case from the oil guiding part through the corresponding one side gear support surface on the one side of the differential case in the axial direction flows along the aforementioned inner diameter changing part toward the other side of the differential case in the axial direction under the centrifugal force. The auxiliary weir extends from the part of the outer circumference of the corresponding one support base, closer to the other side of the differential case in the axial direction with respect to the opened part, toward the window. Thus, the auxiliary weir can also capture the oil flowing along the inner diameter changing part between the opened part and the window and efficiently guide the oil captured to the opened part. This allows sufficient supply of the oil to the pinion gear lubricating oil groove, thereby allowing efficient lubrication of the pinion gear support surfaces.

EXPLANATION OF REFERENCE NUMERALS

C . . . differential case, Ci . . . inner surface of differential case, Cb1, Cb2 . . . bearing boss parts as boss parts, D . . . differential device, Gp . . . pinion gear lubricating oil groove, Gpi . . . opened part of pinion gear lubricating oil groove, P1, P2 . . . first and second pinion gear support surfaces as pinion gear support surfaces, S1, S2 . . . first and second side gear support surfaces as side gear support surfaces, X1, X2 . . . first and second axial lines, 15, 16 . . . helical grooves as oil introduction channels, 18 . . . window, 19 . . . support base, 22 . . . pinion gear, 23 . . . side gear, 30 . . . clearance as oil introduction channel, 40 . . . diameter-enlarged inner surface part, 40o . . . inner surface bottom part, 41 . . . first diameter-enlarged inner surface part as inner diameter changing part, 50 . . . main guide weir as oil introduction part, 52 . . . second weir as enclosure, 54, 54$_1$, 54$_2$ . . . auxiliary weir

MODE FOR CARRYING OUT THE INVENTION

Hereinafter, an embodiment of the present invention is described based on the accompanying drawings.

Figure 1:
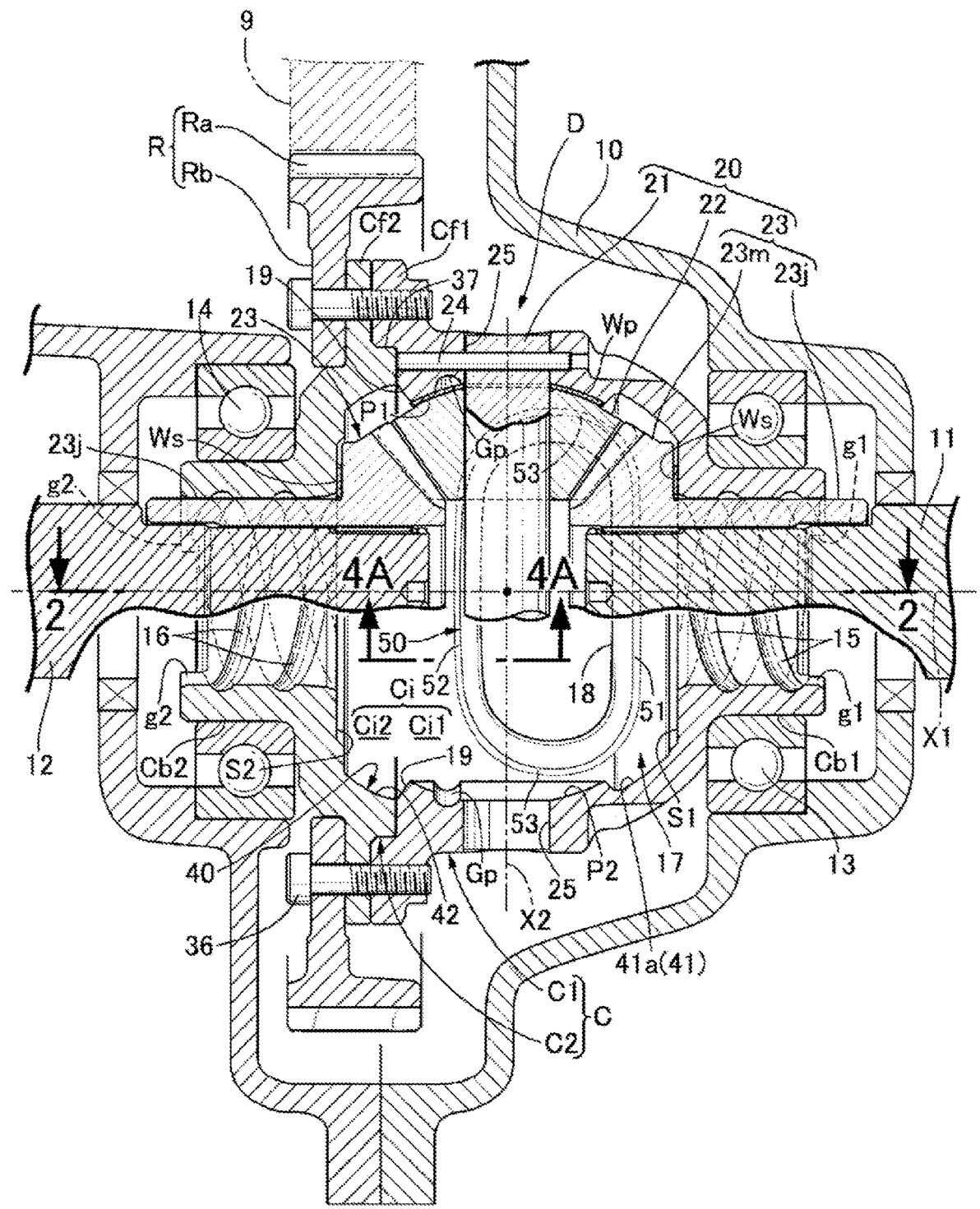
FIG. 1 is a vertical sectional view (sectional view along a line 1-1 in FIG. 2) illustrating a differential device according to a first embodiment of the present invention and its auxiliary devices.
Figure 2:
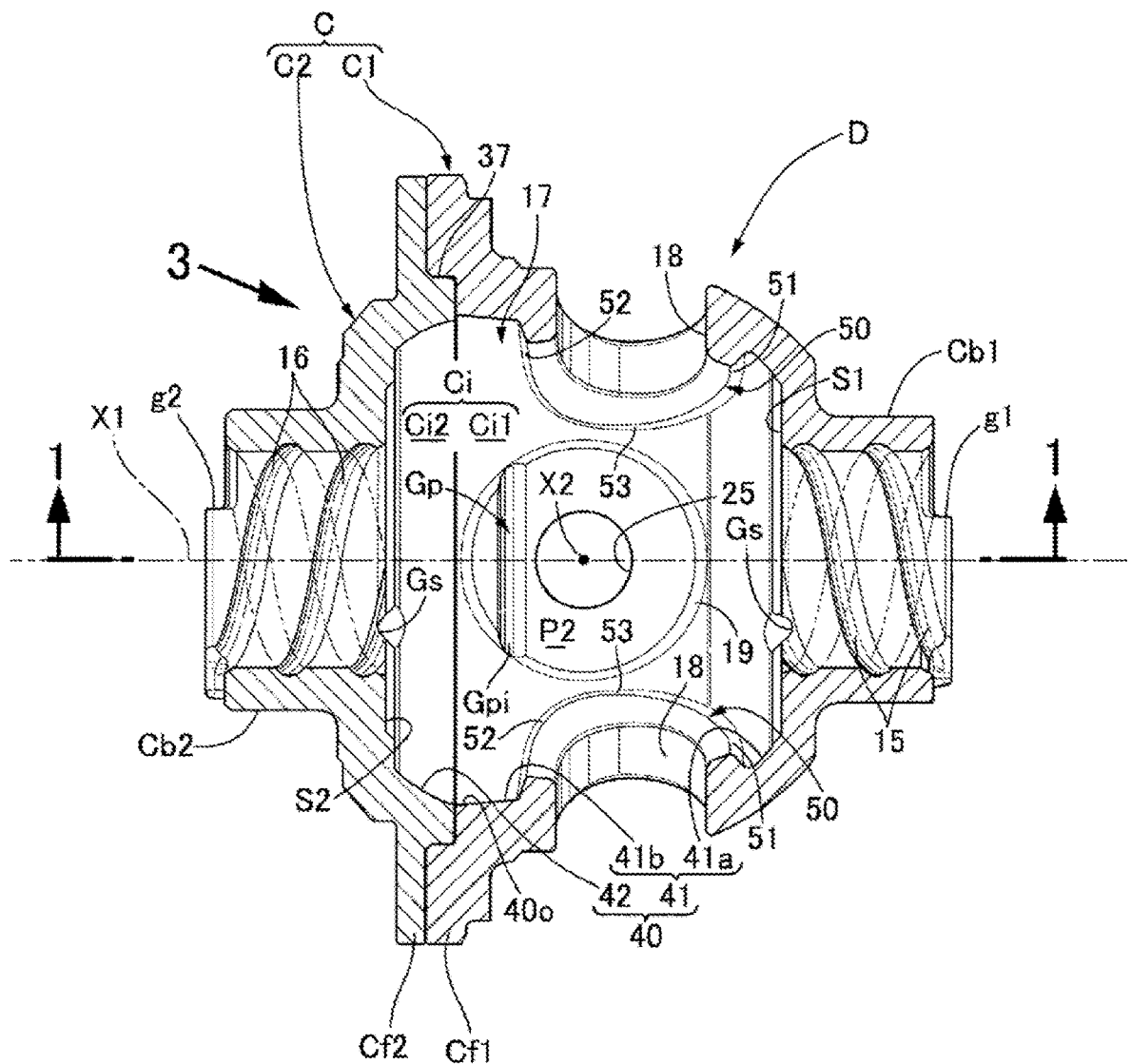
FIG. 2 illustrates a sectional view along a line 2-2 in FIG. 1, in which illustration of a differential mechanism and output shafts are omitted.
Figure 3:
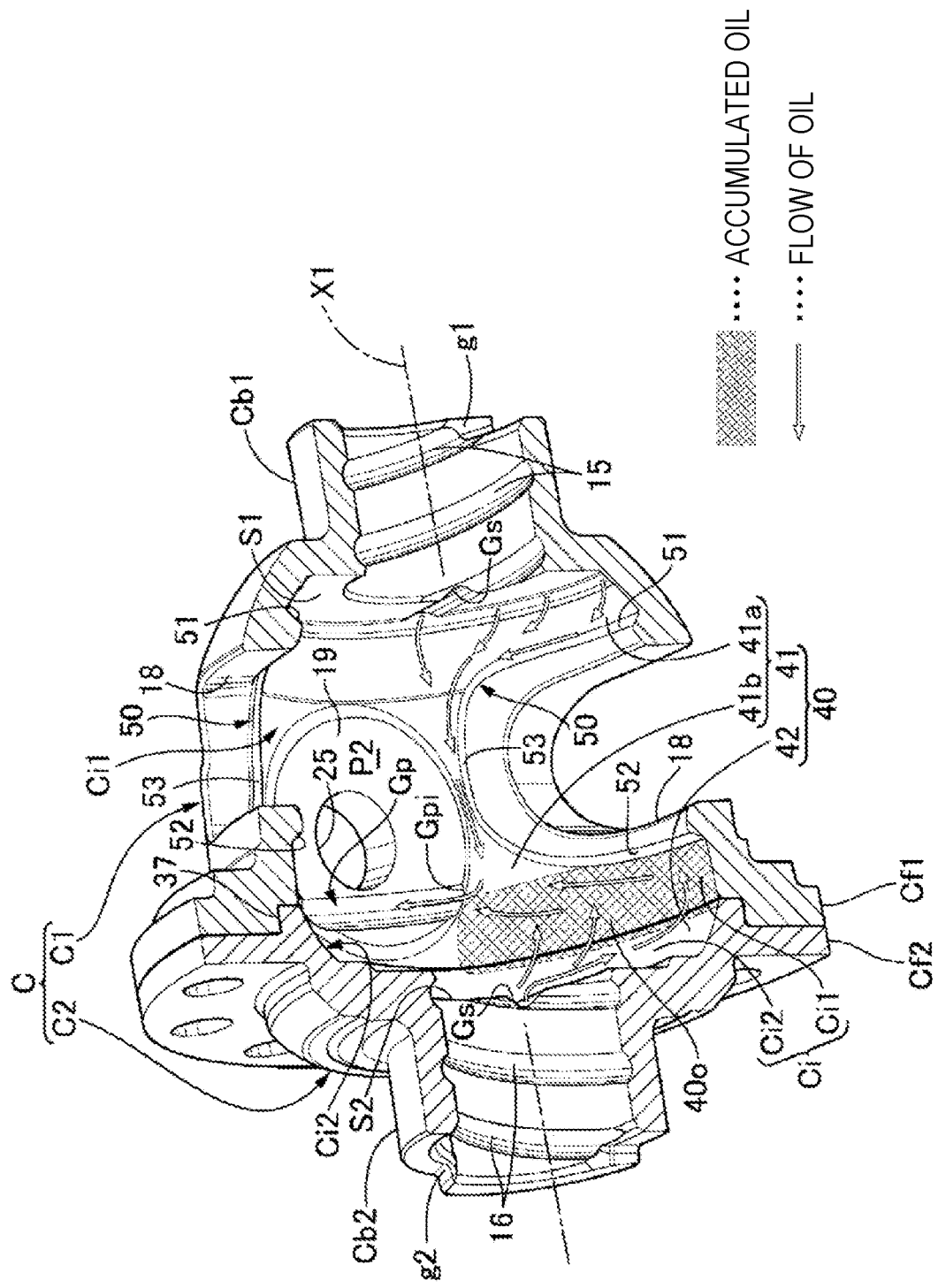
FIG. 3 is a perspective view, as viewed in a direction of an arrow 3 in FIG. 2, illustrating one example of a flow of oil in an inner surface of the differential case.

First, reference is made to FIGS. 1 to 4 to describe a first embodiment. In FIG. 1, a transmission case 10 of a vehicle (for example, an automobile) houses a differential device D configured to divide and transmit a power from a not shown power source (for example, an engine installed in a vehicle, a motor, and the like) to output shafts 11, 12 that are paired as left and right output shafts. The differential device D comprises a differential case C rotatable about a first axial line X1, and a differential mechanism 20 to be built in the differential case C. The left and right output shafts 11, 12, respectively, are interlocked with and coupled to left and right drive wheels (not shown).

In the present specification and the present invention, the term "axial direction" means a direction along the first axial line X1. Furthermore, the term "radial direction" means a direction along a radius of a circle about the first axial line X1.

The differential case C is divided into and comprises a first half case body C1 having a substantially bowl shape and a second half case body C2 having a lid shape to close an open end of the first half case body C1. The first half and second half case bodies C1, C2, respectively, include a flange part Cf1 and a flange part Cf2 provided continuously to outer peripheries of the first half and second half case bodies C1, C2. These flange parts Cf1, Cf2 are laid over and detachably coupled to an inner circumferential flange part Rb of a ring gear R with two or more bolts 36. The first half and second half case bodies C1, C2 have respective facing surfaces provided with concave and convex engagement portions 37 to be coaxially engaged with each other.

The ring gear R includes gear teeth Ra to be engaged with, for example, a drive gear 9, which acts as an output part of a transmission device connected to a power source. This results in transmission of a rotation driving force from the power source to the differential case C via the ring gear R. The ring gear R may be a helical gear or a spur gear.

There is defined, between the first half and second half case bodies C1, C2, an internal space 17 configured to function as a mechanism chamber to house the differential mechanism 20 therein. In particular, the first half case body C1 is provided with, in its body part, windows 18 in pairs that allow communication between an inside and an outside of the differential case C and are formed so as to face each other across the first axial line X1. These windows 18 can not only function as inlet and outlet ports for oil, but also function as working windows to allow a cutting tool, a jig, a finger, or the like to be put in or taken out when an inner surface Ci of the differential case C is machined or the differential mechanism 20 is assembled to the differential case C.

The first half case body C1 includes an axially-outer part provided with, as a part integral therewith, a first bearing boss Cb1. The second half case body C2 includes an axially-outer part provided with, as a part integral therewith, a second bearing boss Cb2. The first and second bearing bosses Cb1, Cb2 are oriented in opposite directions and have cylindrical shapes extending coaxially. The first and second bearing bosses Cb1, Cb2 each are one example of the boss part. The first and second bearing bosses Cb1, Cb2 are supported, on outer peripheries thereof, by the transmission case 10 via a bearing 13 and a bearing 14, respectively, in a freely rotatable manner about the first axial line X1.

Each of the first and second bearing bosses Cb1, Cb2 has an inner circumferential surface fitted with and supporting a corresponding one of the left and right output shafts 11, 12 via a hollow shaft part 23*j* of each side gear 23 to be described later such that the corresponding one of the left and right output shafts 11, 12 is freely rotatable. Moreover, the first and second bearing bosses Cb1, Cb2, respectively, are provided with one or more lines (two lines in the embodiment) of helical grooves 15, 16 (see, FIG. 1) for drawing lubricating oil therein. The helical groove 15 of the first bearing boss Cb1 and the helical groove 16 of the second bearing boss Cb2 have helical directions opposite to each other.

During the automobile making a turn, as the differential mechanism 20 rotates at different speeds, the first and second bearing bosses Cb1, Cb2 and the respective hollow shaft parts 23*j* of the side gears 23 on the left and right sides rotate with respect to each other. In response to this, the helical grooves 15, 16, each of which is one example of the oil introduction channel, can exhibit a pumping action to deliver the lubricating oil from the outside of the differential case C to the inner surface Ci of the differential case C (particularly, side gear support surfaces S1, S2 to be described later). At respective outer ends, the first and second bearing bosses Cb1, Cb2, respectively, are provided with guide protrusions g1, g2 configured to enable guiding of the lubricating oil that scatters and flows down around the differential case C of the transmission case 10 to upstream ends of the helical grooves 15, 16.

The differential mechanism 20 comprises: a pinion shaft 21 arranged in a center part of the differential case C along a second axial line X2 orthogonal to the first axial line X1 and supported by the differential case C; pinion gears 22 in pairs fitted to and supported by the pinion shaft 21 in a freely rotatable manner; and the side gears 23, 23 in pairs to mesh with the respective pinion gears 22 and supported by the differential case C in a freely rotatable manner about the first axial line X1.

The pinion shaft 21 in the present embodiment has both ends fitted in pinion shaft support holes 25 provided in the body part of the first half case body C1. Moreover, the pinion shaft 21 is fixed to the differential case C with a fixing pin 24 that is inserted in the body part. The way to fix the pinion shaft 21 is not limited to the present embodiment, and various fixing ways (for example, clamping, screwing, and the like) may be employed.

The side gears 23, 23 in pairs function as output gears of the differential mechanism 20. These side gears 23, 23 have respective inner circumferential parts, which are in spline engagement with leading ends of the output shafts 11, 12 in pairs.

Each side gear 23 includes: a side gear main body 23*m* including teeth and having a large diameter; and a hollow shaft part 23*j* protruding at a center in a back side of the side gear main body 23*m* as a piece integral with the side gear main body 23*m*. The back side of one side gear 23 is supported in a rotatable and slidable manner, via a side gear washer Ws, by a first side gear support surface S1 of an inner surface Ci1 of the first half case body C1. The first side gear support surface S1 is continuous to an inner end of the first bearing boss Cb1. The back side of the other side gear 23 is supported in a rotatable and slidable manner, via the side gear washer Ws, by a second side gear support surface S2 of an inner surface Ci2 of the second half case body C2. The second side gear support surface S2 is continuous to an inner end of the second bearing boss Cb2.

Each of the first and second side gear support surfaces S1, S2 in the present embodiment is formed in an annular planar surface orthogonal to the first axial line X1. Alternatively, each side gear support surface may be formed in a part of a tapered or spherical surface (see, a third embodiment in FIGS. 7, 8) in place of the annular planar surface. Furthermore, each of the first and second side gear support surfaces S1, S2 is provided with side gear lubricating oil grooves Gs in pairs such that the side gear lubricating oil grooves Gs cross a corresponding one of the side gear support surfaces S1, S2. The side gear lubricating oil grooves Gs communicate with downstream ends of the respective helical grooves 15, 16. It should be noted that the side gear washer Ws may be omitted. In this case, the respective back sides of the side gears 23 are directly supported by the first and second side gear support surfaces S1, S2 in a rotatable and slidable manner.

The inner surface Ci of the differential case C includes a diameter-enlarged inner surface part 40 that couples the side gear support surfaces S1, S2 in pairs to each other and has a diameter enlarged relative to each of the side gear support surfaces S1, S2. The diameter-enlarged inner surface part 40 includes a first diameter-enlarged inner surface part 41 and a second diameter-enlarged inner surface part 42. The first diameter-enlarged inner surface part 41 corresponds to an outer peripheral area in the inner surface Ci1 of the first half case body C1, is relatively wider in the axial direction, and has an annular shape. The second diameter-enlarged inner surface part 42 corresponds to an outer peripheral area in the inner surface Ci2 of the second half case body C2, is relatively narrower in the axial direction, and has an annular shape.

The first diameter-enlarged inner surface part 41 includes a steeply-enlarged inner surface part 41*a* and a gently-enlarged inner surface part 41*b*. The steeply-enlarged inner surface part 41*a* has a diameter steeply increasing from an outer peripheral end of the first side gear support surface S1 toward the second side gear support surface S2 (that is, an enlarging rate of its inner diameter is high). The gently-enlarged inner surface part 41*b* has a diameter gently increasing from the steeply-enlarged inner surface part 41*a* toward the open end of the first half case body C1 (that is, an enlarging rate of its inner diameter is low). The first diameter-enlarged inner surface part 41 is one example of the inner diameter changing part of the present invention (particularly, the fourth feature) having a diameter enlarged, in an axial range from the first side gear support surface S1 on one side of the differential case C in the axial direction to at least opened parts Gpi of pinion gear lubricating oil grooves Gp to be described later (in the embodiment, to the open end of the first half case body C1), toward the other side of the differential case C in the axial direction.

The second diameter-enlarged inner surface part 42 is formed by only a steeply-enlarged inner surface part that has a diameter steeply enlarged from an outer peripheral end of the second side gear support surface S2 toward an open end of the second half case body C2 (that is, an enlarging rate of its inner diameter is high). It should be noted that each of the second diameter-enlarged inner surface part 42 and the steeply-enlarged inner surface part 41*a* may be a part of a spherical surface or a sloped surface.

With respect to the above-described diameter-enlarged form of the first and second diameter-enlarged inner surface parts 41, 42, the first and second diameter-enlarged inner surface parts 41, 42 each have an annular recessed surface configuration with the deepest part (that is, most recessed in a radially outward direction), in the diameter-enlarged inner surface part 40, at a joining part between the first and second diameter-enlarged inner surface parts 41, 42 and its peripheral part. The recessed surface configuration is a part of an inner surface bottom part 40o. In the inner surface bottom part 40o, oil introduced on the diameter-enlarged inner surface part 40 through the side gear support surfaces S1, S2 flows along the first and second diameter-enlarged inner surface parts 41, 42 and is accumulated due to an action of a centrifugal force as the differential case C rotates. In the embodiment, as is clear from FIGS. 2, 3, the inner surface bottom part 40o is formed like a shallow depression.

The pinion gears 22 have respective spherical back sides supported by support bases 19 in pairs that are provided to the diameter-enlarged inner surface part 40 (more specifically, the first diameter-enlarged inner surface part 41) of the inner surface Ci of the differential case C in a manner to protrude concentrically to the pinion shaft 21 and face each other. Specifically, respective top surfaces of both the support bases 19, which face each other, are formed into concave surfaces having spherical shapes, and form a first pinion gear support surface P1 and a second pinion gear support surface P2 as the pinion gear support surfaces to support the pinion gears. The respective back sides of the pinion gears 22 abut and are supported by the pinion gear support surfaces P1, P2 via pinion gear washers Wp in a rotatable and slidable manner. The pinion gear washers Wp may be omitted. In this case, the respective back sides of the pinion gears 22 are directly supported by the first and second pinion gear support surfaces P1, P2 in a rotatable and slidable manner.

As viewed in a projection plane (see, FIG. 2) orthogonal to the second axial line X2, each of the first and second pinion gear support surfaces Pt, P2 is provided with a line of a pinion gear lubricating oil groove Gp linearly and orthogonally extending to the axial line X1. Both ends of each pinion gear lubricating oil groove Gp function as the opened parts Gp that are directly open to an outer circumferential surface of a corresponding one of the support bases 19. As is clear from FIG. 3, the opened parts Op are open to the inner surface bottom part 40o of the diameter-enlarged inner surface part 40.

The inner surface Ci of the differential case C may not be provided with the support bases 19 described above, and a part of the inner surface Ci can be pinion gear support surfaces. In this case, by providing the inner surface Ci of the differential case C, in the vicinity of outer circumferences of the pinion gear support surfaces, with parts slightly recessed from the pinion gear support surfaces, the ends of the pinion gear lubricating oil grooves Gp are open to the inner surface Ci of the differential case C in the outer circumferences of the pinion gear support surfaces P1, P2 through resulting slight recesses.

Furthermore, the pinion gear lubricating oil grooves Gp of the first and second pinion gear support surfaces P1, P2 are arranged at positions axially symmetrical to the first axial line X1 as viewed in the projection plane (see, FIG. 2) orthogonal to the second axial line X2. Although the first and second pinion gear support surfaces P1, P2 in the embodiment are illustrated as spherical recessed surfaces by way of example, each pinion gear support surface may be a tapered surface or a planar surface orthogonal to the second axial line X2.

In the inner surface Ci of the differential case C, there is provided main guide weirs 50 protruding therefrom. The main guide weirs 50 are configured to guide at least some of oil to the pinion gear support surfaces P1, P2 such that the at least some of the oil deviates from a flow direction from the first and second side gear support surfaces S1, S2 to the windows 18 along the inner surface Ci and flows around the window 18. The main guide weirs 50 each are a part of the oil guiding part of the present invention. In the present embodiment, the main guide weirs 50 are formed so as to (i) enclose entire circumferences of the respective windows 18 and extend in a circumferential direction of the windows 18 and (ii) protrude radially inward of the first diameter-enlarged inner surface part 41 of the inner surface Ci (that is, toward the first axial line X1).

Each of the main guide weirs 50 particularly in the first embodiment includes a first weir 51, a second weir 52, and third weirs 53 in pairs. The first weir 51 is situated between, in the axial direction, the first side gear support surface S1 in the first half case body C1 and a circumferential rim of a corresponding one of the windows 18, and extends in the circumferential direction of the corresponding one window 18. The second weir 52 is situated between, in the axial direction, the second side gear support surface S2 in the second half case body C2 and the circumferential rim of the corresponding one window 18, and extends in the circumferential direction of the corresponding one window 18. The third weirs 53 in pairs are situated between, in a circumferential direction of the differential case C, the pinion gear support surfaces P1, P2 and the circumferential rim of the corresponding one window 18, and extend in the circumferential direction of the corresponding one window 18.

The third weirs 53 couple one end of the first weir 51 in the circumferential direction and one end of the second weir 52 in the circumferential direction to each other; and couple the other end of the first weir 51 in the circumferential direction and the other end of the second weir 52 in the circumferential direction to each other. Respective coupling portions of the third weirs 53 to the first and second weirs 51, 52 are arcuately formed so as to follow a curve of the circumferential rim of the corresponding one window 18. In the first diameter-enlarged inner surface part 41 of the differential case C, the second weir 52 is located between the inner surface bottom part 40o described above and the windows 18, and formed to protrude radially inward of the inner surface bottom part 40o (that is, toward the first axial line X1).

Next, a description is given to an operation effect of the first embodiment. During traveling of an automobile into which the differential device D of the present embodiment is assembled, a rotation driving force from the power source is transmitted from the ring gear R to the differential case C. Then, the rotation driving force is divided and transmitted to the left and right output shafts 11, 12 via the differential mechanism 20 of the differential device D with the differential mechanism 20 being allowed to rotate at different speeds. In this case, the differential mechanism 20 does not rotate at different speeds during the automobile travelling straight. Specifically, the first and second bearing bosses Cb1, Cb2 of the differential case C and the left and right side gears 23 (that is, the output shafts 11, 12) rotate forwardly, not rotate relative to each other, respectively.

In contrast, during the automobile making a turn, the first and second bearing bosses Cb1, Cb2 and the left and right side gears 23 rotate relative to each other, respectively, as the differential mechanism 20 rotates at different speeds due to differences in turning radius of left and right drive wheels. As a result of this relative rotation, the helical grooves 15, 16 can exhibit the pumping action. Thus, the oil introduced from the outside of the differential case C (particularly, near an outer end of each of the bearing bosses Cb1, Cb2) into the helical grooves 15, 16 with the guide protrusions g1, g2 flows to the side gear support surfaces S1, S2 inside the differential case C through the helical grooves 15, 16. Specifically, the oil flows into the side gear lubricating oil grooves Gs to thereby lubricate the side gear support surfaces S1, S2. The oil that has lubricated the first and second side gear support surfaces S1, S2 is radially released, due to the action of the centrifugal force generated by rotation of the differential case C, from any position on outer ends of the first and second side gear support surfaces S1, S2, and flows along the first and second diameter-enlarged inner surface parts 41, 42.

The oil that has been released from the side gear support surfaces S1, S2 flows along the diameter-enlarged inner surface part 40 (specifically, the first and second diameter-enlarged inner surface parts 41, 42) of the differential case C substantially in the axial direction, and in the end, the oil released is gathered in the inner surface bottom part 40o, which is a radially outermost part of the diameter-enlarged inner surface part 40. Since the opened parts Gpi of the pinion gear lubricating oil grooves Gp face the inner surface bottom part 40o, the oil accumulated in the inner surface bottom part 40o is sufficiently supplied to the pinion gear lubricating oil grooves Gp, to thereby efficiently lubricate the pinion gear support surfaces P1, P2.

Particularly, in the embodiment, since the oil is introduced from the helical grooves 15, 16 as the oil introduction channels into the differential case C through the side gear support surfaces S1, S2, there is a greater ratio of the oil flowing from the side gear support surfaces S1, S2 to the diameter-enlarged inner surface part 40 in the axial direction (toward the windows 18). In this regard, the inner surface Ci of the differential case C is specially provided with the main guide weirs 50 so as to guide at least some of the oil such that the at least some of the oil deviates from a flow direction from the side gear support surfaces S1, S2 to the windows 18 along the diameter-enlarged inner surface part 40 (specifically the first and second diameter-enlarged inner surface parts 41, 42) of the inner surface Ci of the differential case C, and flows around the windows 18. Thus, particularly the first and second weirs 51, 52 of each main guide weir 50, situated between the side gear support surfaces S1, S2 and the corresponding one window 18, can guide the oil flowing in the axial direction from the side gear support surfaces S1, S2 through the diameter-enlarged inner surface part 40 so as to gather the same to the inner surface bottom part 40o in a manner to flow the oil around the windows 18. This can suppress outflow of the oil through the windows 18. Accordingly, the oil that has lubricated the first and second side gear support surfaces S1, S2 can be reused for lubrication of other parts to be lubricated in the differential case C, thereby improving lubrication efficiency of parts in the differential case C.

The respective pinion gear support surfaces P1, P2 provided to the inner surface Ci of the differential case C in the embodiment are provided with the pinion gear lubricating oil grooves Gp, which are open to the inner surface Ci of the differential case C in the outer circumferences of the pinion gear support surfaces P1, P2. Thus, as discussed above, the oil guided with the main guide weirs 50 so as to flow around the windows 18 can be effectively supplied to the pinion gear lubricating oil grooves Gp, and the pinion gear support surfaces P1, P2 can be efficiently lubricated.

Particularly, the third weirs 53 of each main guide weir 50, situated between the pinion gear support surfaces P1, P2 and the corresponding one window 18, do not interrupt a flow of the oil from the first side gear support surface S1 on the one side of the differential case C in the axial direction to the second side gear support surface S2 on the other side of the differential case C in the axial direction around the corresponding one window 18. Moreover, for the oil flowing from the pinion gear support surfaces P1, P2 to the corresponding one window 18 in the circumferential direction, the third weirs 53 function to prevent outflow of the oil through the corresponding one window 18.

The side gear support surfaces S1, S2 in the embodiment are formed into the annular planar surfaces orthogonal to the first axial line X1. The inner surface Ci of the differential case C couples the side gear support surfaces S1, S2 in pairs to each other, and comprises the diameter-enlarged inner surface part 40 having a diameter enlarged relative to each of the side gear support surfaces S1, S2. The diameter-enlarged inner surface part 40 includes the inner surface bottom part 40o to which the oil flowing along the diameter-enlarged inner surface part 40 is gathered due to the centrifugal force. Consequently, the oil introduced from the helical grooves 15, 16 through the side gear support surfaces S1, S2 flows along the diameter-enlarged inner surface part 40 under the centrifugal force and is easily accumulated in the inner surface bottom part 40o, which is situated in a radially outer side of the diameter-enlarged inner surface part 40. Since the side gear support surfaces S1, S2, in particular, are annular planar surfaces and extend radially outward, an area having an enlarged diameter (that is, deeper radially outward) can be widely obtained in the inner surface Ci of the differential case C in the axial direction as compared to a case where the side gear support surfaces S1, S2 themselves each have a structure in which the diameter is gradually enlarged from an inner circumferential end to an outer circumferential end thereof (for example, a differential case structure in which the side gear support surfaces S1, S2 each are formed into a spherical shape or tapered shape). A large amount of the oil can be stored in the inner surface bottom part 40o, which is recessed most in the area having an enlarged diameter.

Moreover, between the inner surface bottom part 40o and the windows 18, the inner surface Ci of the differential case C is provided with the main guide weirs 50 (more specifically, the second weirs 52) that protrude toward the first axial line X1 (that is, radially inward) with respect to the inner surface bottom part 40o. The pinion gear lubricating oil grooves Gp are open to the inner surface bottom part 40o. Thus, a large amount of the oil accumulated in the inner surface bottom part 40o can be sufficiently supplied to the pinion gear lubricating oil grooves Op, thereby efficiently lubricating the pinion gear support surfaces P1, P2.

Figure 5:
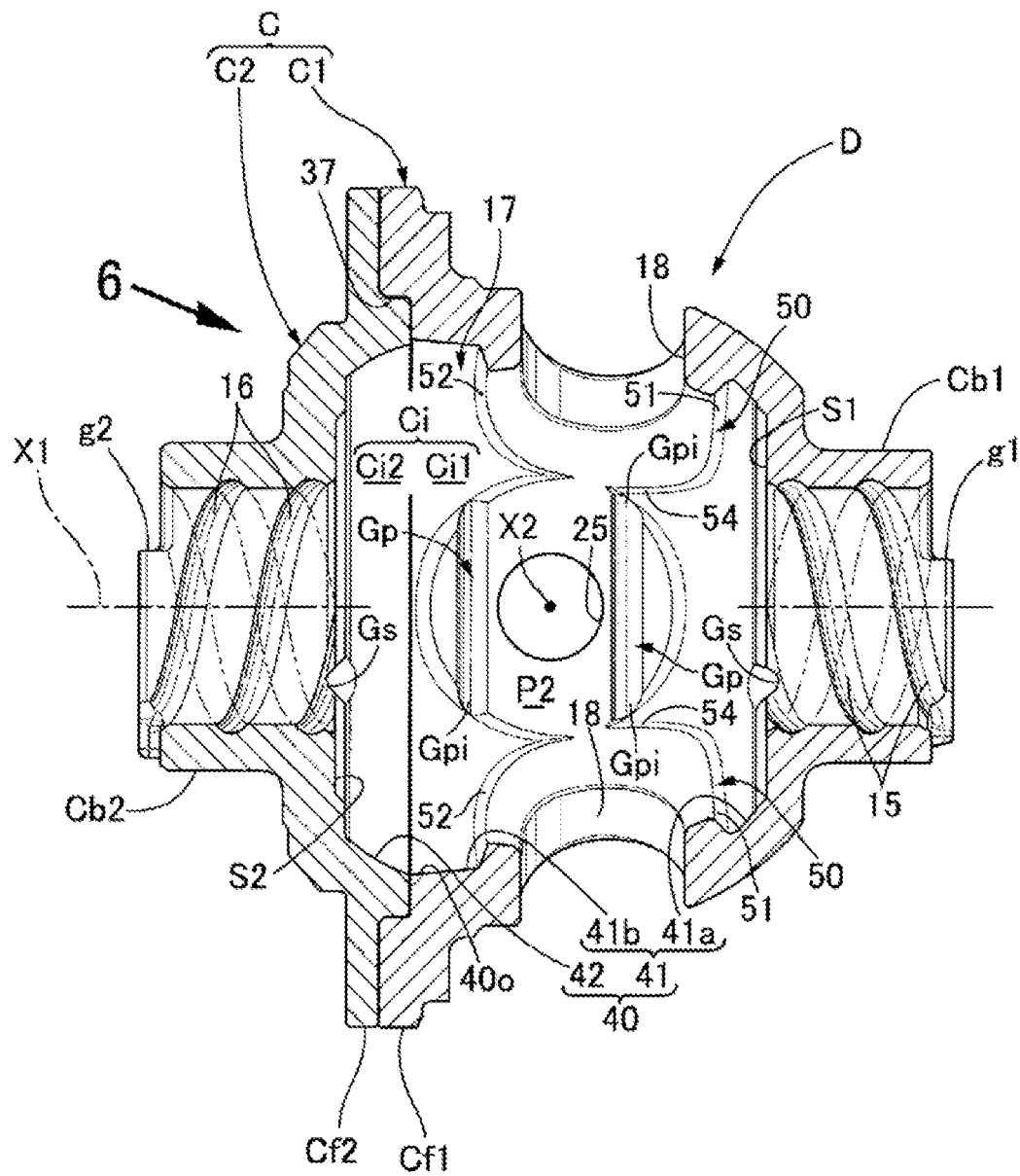
FIG. 5 is a sectional view (view corresponding to FIG. 2) illustrating a main part of a differential case according to a second embodiment.
Figure 6:
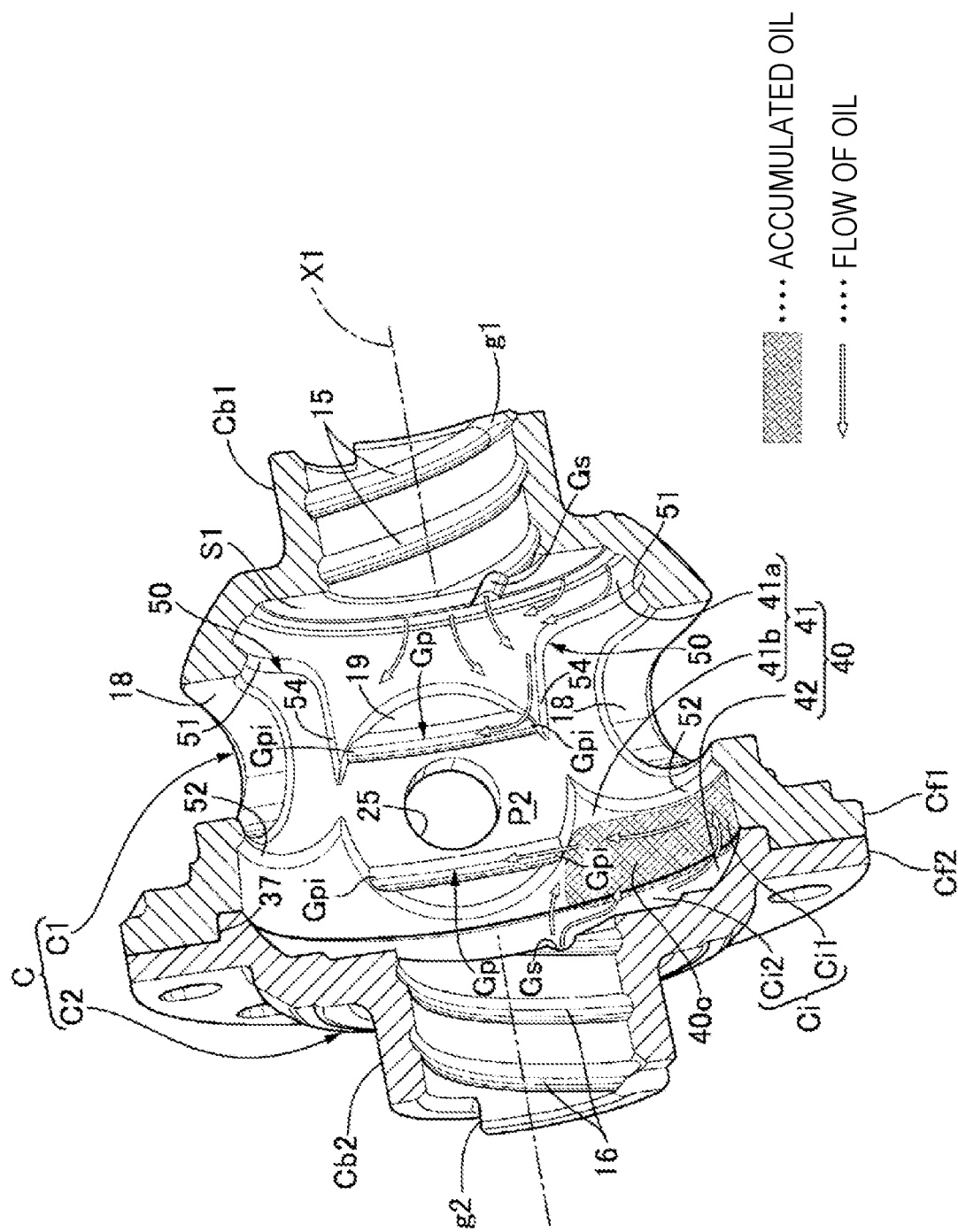
FIG. 6 is a perspective view, as viewed in a direction of an arrow 6 in FIG. 5, illustrating one example of a flow of oil in an inner surface of the differential case.

FIGS. 5 and 6 illustrate a second embodiment of the present invention. The main guide weirs 50 in the first embodiment are illustrated as continuously extending weirs so as to enclose the entire circumferences of the windows 18. In the second embodiment, each main guide weir 50 includes, in a part thereof (part corresponding to the third weirs 53 in the first embodiment), a non-continuous area.

Specifically, in the second embodiment, auxiliary weirs 54 are provided to the first diameter-enlarged inner surface part 41 in a protruding manner in place of the third weir 53 in the first embodiment. Each auxiliary weir 54 extends from a part of an outer circumference of a corresponding one of the support bases 19, closer to the second side gear support surface S2 with respect to the opened parts Gpi of the pinion gear lubricating oil groove Gp in the axial direction, to the corresponding one window 18 and is smoothly continuous to the first weir 51. Both ends of the second weir 52 are continuous to the outer circumference of the support base 19.

Furthermore, in the second embodiment, each of the pinion gear support surfaces P1, P2 is provided with two lines of pinion gear lubricating oil grooves Gp parallel to each other across the second axial line X2.

As described above, the first diameter-enlarged inner surface part 41 in the inner surface Ci of the differential case C constitutes the inner diameter changing part of the present invention (particularly, the fourth feature) that has a diameter enlarged, in the axial range from the one side of the differential case C in the axial direction (in the embodiment, the first side gear support surface S1) to at least the opened parts Gpi (in the embodiment, the open end of the first half case body C1), toward the other side of the differential case C in the axial direction. The auxiliary weirs 54 function to capture some of the oil flowing on the first diameter-enlarged inner surface part 41 as the inner diameter changing part from the first side gear support surface S1 to the second side gear support surface S2, to thereby guide the same to the opened parts Gpi.

The oil introduced into the differential case C from the helical groove 15 through the corresponding first side gear support surface S1 flows along the first diameter-enlarged inner surface part 41 (the inner diameter changing part) toward the second side gear support surface S2 under the centrifugal force resulting from rotation of the differential case C. In the second embodiment, the auxiliary weirs 54 capture some of the oil to thereby guide the same to the opened parts Gpi. In this case, each auxiliary weir 54 extends from the part of the outer circumference of the corresponding one support base 19, closer to the second side gear support surface S2 with respect to the opened parts Gpi in the axial direction, toward the corresponding one window 18. Thus, even in the case of a flow path of a direction in which the oil flowing toward the second side gear support surface S2 along the first diameter-enlarged inner surface part 41 (the inner diameter changing part) does not directly flow into the opened parts Gpi, the oil flowing between the opened parts Gpi and the windows 18 can be captured by the auxiliary weirs 54. The oil captured by the auxiliary weirs 54 tends to flow from positions captured toward the second side gear support surface S2 along the first diameter-enlarged inner surface part 41 (the inner diameter changing part). Thus, by extending the auxiliary weirs 54 toward the first side gear support surface S1 (in other words, an upstream side in a direction in which the oil flows along the first diameter-enlarged inner surface part 41) in the axial direction, the oil captured by the auxiliary weirs 54 can be efficiently introduced to the opened parts Gpi located closer to the second side gear support surface S2 (in other words, a downstream side in the direction in which the oil flows along the first diameter-enlarged inner surface part 41) along the auxiliary weirs 54. As described above, the oil captured by the auxiliary weirs 54 can be efficiently guided to the opened parts Gpi and sufficiently supplied to the pinion gear lubricating oil grooves Gp. Accordingly, the pinion gear support surfaces P1, P2 can be efficiently lubricated. It should be noted that, in the second embodiment, the respective auxiliary weirs 54 are continuous to the first weirs 51 and thus, the oil captured by the first weirs 51 can be also guided to the opened parts Gpi. Accordingly, the oil can be effectively supplied to the pinion gear lubricating oil grooves Gp.

Other configurations in the second embodiment are basically the same as those in the first embodiment. Thus, constituent elements in the second embodiment are labelled with the same reference numerals used for the corresponding constituent elements in the first embodiment, and detailed description of configurations of these constituent elements will be omitted. The second embodiment can also achieve operation effects that are basically the same as those of the first embodiment due to the main guide weirs 50 (particularly, the first and second weirs 51, 52).

Figure 7:
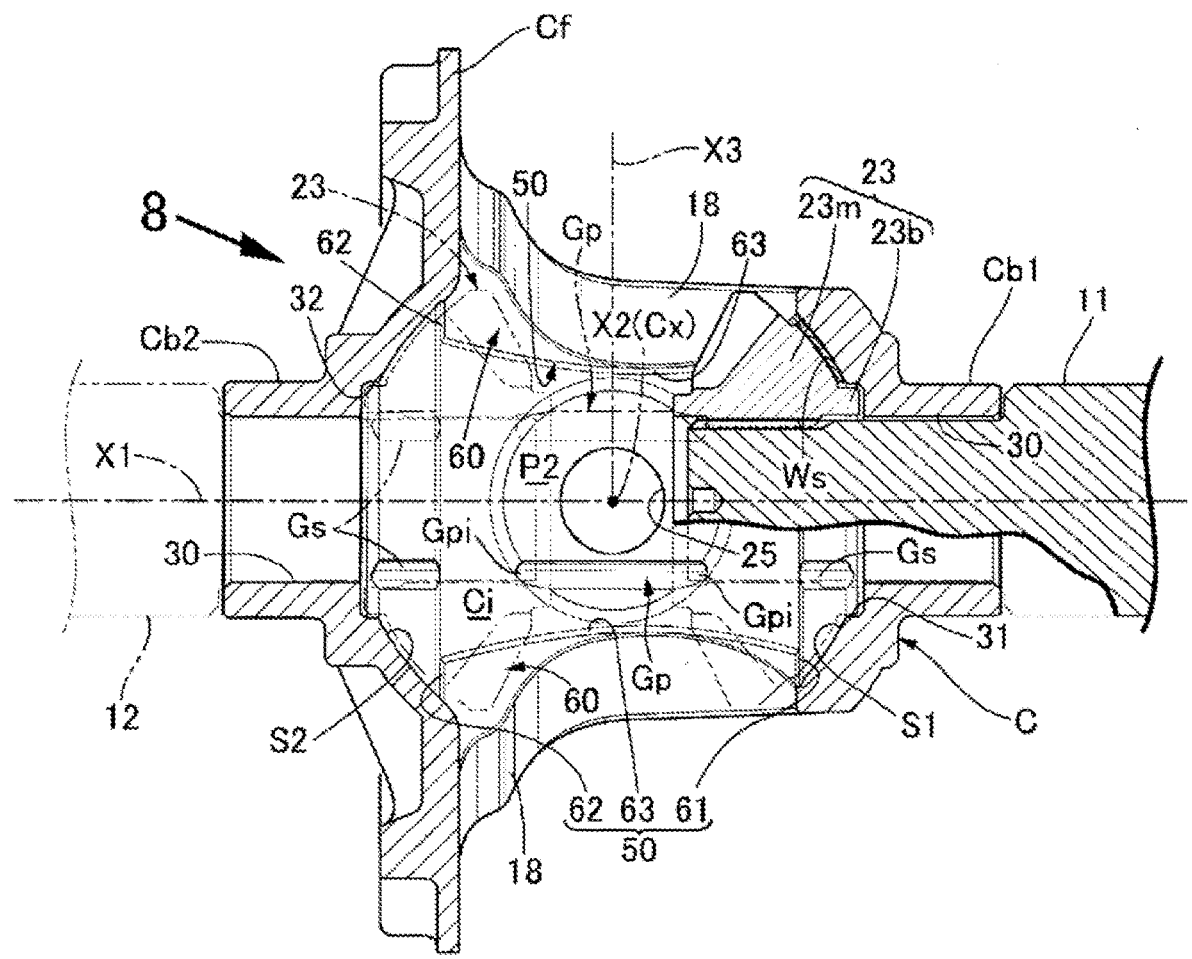
FIG. 7 is a sectional view (corresponding to FIG. 2) illustrating a main part of a third embodiment.
Figure 8:
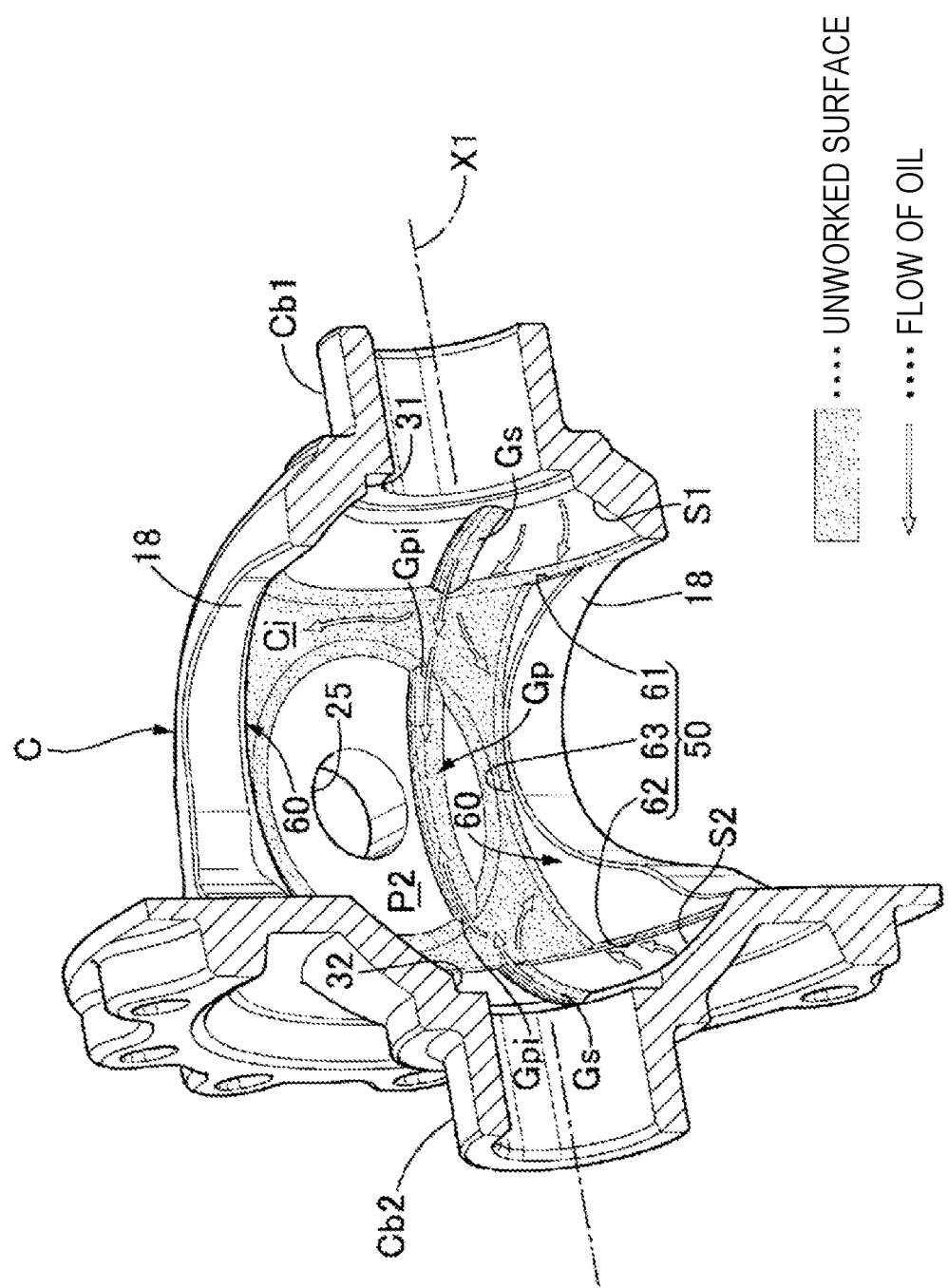
FIG. 8 is a perspective view, as viewed in a direction of an arrow 8 in FIG. 7, illustrating one example of a flow of oil in an inner surface of a differential case.

Furthermore, FIGS. 7, 8 illustrate a third embodiment of the present invention. In the first and second embodiments, the differential case C is divided into and comprises the first half and second half case bodies C1, C2, whereas in the third embodiment, the differential case C is formed into a seamless, integral case including an inner surface Ci having a spherical shape. The differential case C includes a body part provided with large windows 18 in pairs through which the side gears 23 and the pinion gears 22 are assembled into the differential case C. Still further, an outer circumferential part of the differential case C is integrally provided with a flange part Cf to fix the ring gear R thereto such that the flange part Cf and the one sides of the windows 18 are aligned in a direction along the first axial line X1.

Furthermore, each of the left and right side gears 23 integrally includes, in the center in the back side of the side gear main body 23m including the gear teeth, a boss part 23b having a short length in place of the hollow shaft part 23j having a long length as in the first and second embodiments. The inner surface Ci of the differential case C comprises: annular recesses 31, 32, the side gear support surfaces S1, S2; and the pinion gear support surfaces P1, P2. The annular recesses 31, 32, respectively, are continuous to inner circumferential inner ends of the first and second bearing bosses Cb1, Cb2 and receive the boss parts 23b. The side gear support surfaces S1, S2 have annular and spherical shapes, are continuous to outer circumferential ends of the annular recesses 31, 32, and support respective spherical back sides of the side gears 23 directly or via the side gear washers Ws such that the side gears 23 can rotate and slide on the side gear support surfaces S1, S2. The pinion gear support surfaces P1, P2 have annular and spherical shapes, are continuous to inner open ends of the pinion shaft support holes 25, and support respective spherical back sides of the pinion gears 22 directly or via the pinion gear washers such that the pinion gears 22 can rotate and slide on the pinion gear support surfaces P1, P2.

Still further, the inner circumferential surfaces of the first and second bearing bosses Cb1, Cb2, respectively, are directly fitted with the output shafts 11, 12, with clearances 30 defined in a size large enough to allow the lubricating oil to flow therein. Each clearance 30 is a part of an oil introduction channel that can introduce the lubricating oil from the outside of the differential case C to the first and second side gear support surfaces S1, S2 (particularly, the side gear lubricating oil grooves Gs). It should be noted that outer ends of the first and second bearing bosses Cb1, Cb2 in the third embodiment may be provided with guide protrusions g1, g2 (illustration omitted), respectively, for introducing the lubricating oil as in the first embodiment. Furthermore, in place of the clearances 30 described above, the inner circumferential surfaces of the first and second bearing bosses Cb1, Cb2 may be provided with oil introduction channels, that is, the helical grooves 15, 16, respectively, as in the first embodiment.

As described above, in the third embodiment as well, the inner surface Ci of the differential case C is provided with the pinion gear lubricating oil grooves Gp and the side gear lubricating oil grooves Gs. In particular, the pinion gear lubricating oil grooves Gp extend in parallel to the first axial line X1, unlike in the first and second embodiments, as viewed in a projection plane orthogonal to the second axial line X2 (see, FIG. 7). The pinion gear lubricating oil grooves Gp and the side gear lubricating oil grooves Gs are formed into grooves arranged along a circular arc about a specific axial line X3 that passes through a spherical center Cx of the inner surface Ci of the differential case and the windows 18.

The main guide weirs 50 are provided in a protruding manner in the inner surface Ci of the differential case C as the oil guiding part so as to guide at least some of oil to the pinion gear support surfaces P1, P2 such that the at least some of the oil deviates from a flow direction from the first and second side gear support surfaces S1, S2 to the windows 18 along the inner surface Ci of the differential case C and flows around the windows 18.

The main guide weirs 50 in the third embodiment are formed on weir-forming platforms 60 in pairs. Each of the weir-forming platforms 60 protrudes radially inward of the inner surface Ci of the differential case C, that is, toward the first axial line X1, and is interposed between each of the pinion gear support surfaces P1, P2 and a corresponding one of the windows 18. Each weir-forming platform 60 extends, adjacent to the corresponding one window 18, so as to substantially follow the first axial line X1, and has both ends reaching in the vicinity of the first and second side gear support surfaces S1, S2.

On an outer periphery of each weir-forming platform 60, there is provided a step face between the weir-forming platform 60 and the inner surface Ci. The step face includes a first step face 61, a second step face 62, and a third step face 63. Particularly, the first step face 61 having a circular arc shape along an outer circumference of the first side gear support surface S1 functions as a first weir to guide at least some of oil, flowing out from the outer circumference of the first side gear support surface S1, toward the pinion gear support surfaces P1, P2 in a manner to flow the at least some of the oil around the windows 18. The second step face 62 having a circular arc shape along an outer circumference of the second side gear support surface S2 functions as a second weir to guide at least some of oil, flowing out from the outer circumference of the second side gear support surface 82, toward the pinion gear support surfaces P1, P2 in a manner to flow the at least some of the oil around the window 18. The third step face 63 extending in an elongated manner in a circular arch shape between each of the pinion gear support surfaces P1, P2 and the corresponding one window 18 functions as a third weir to suppress outflow of the oil, flowing between each of the pinion gear support surfaces P1, P2 and the corresponding one window 18, through the window 18.

The outer periphery of the weir-forming platform 60, particularly the first to third step faces 61 to 63 described above can guide at least some of oil to the pinion gear support surfaces P1, P2 such that the at least some of the oil deviates from a flow direction from the side gear support surfaces S1, S2 to the window 18 along the inner surface Ci of the differential case C and flows around the window 18. Thus, such a configuration can contribute to suppression of outflow of the oil through the windows 18. Accordingly, in the third embodiment, the first to third step faces 61 to 63 of the weir-forming platform 60, which function as the first to third weirs described above, constitute each of the main guide weir 50.

In the third embodiment, in the inner surface Ci of the differential case C, respective areas forming top faces of the weir-forming platforms 60, respective areas forming rotating and sliding surfaces of the side gear support surfaces S1, S2 with respect to the side gears 23, and respective areas forming rotating and sliding surfaces of the pinion gear support surfaces P1, P2 with respect to the pinion gears 22 are machine-worked surfaces formed in the same spherical surface. Areas different from those mentioned, that is, areas in the inner surface Ci surrounded by the weir-forming platforms 60, the pinion gear support surfaces P1, P2, and the side gear support surfaces S1, S2, the pinion gear lubricating oil grooves Gp, and the side gear lubricating oil grooves Gs are unworked surfaces positioned lower (that is, toward a radially outer side) than the above-described machine-worked surfaces. When the differential case C is molded, for example, cast-molded, the unworked surfaces are as-cast surfaces left without being subsequently worked after casting. In FIG. 8, the unworked surfaces are indicated by stippling.

Machining of the inner surface Ci of the differential case C is performed by, for example, using a cutting tool for machining (for example, a bite for turning a tool) to be moved into a molded material of the differential case through the window 18 along the specific axial line X3, with the material of the differential case being rotated about the specific axial line X3.

This method for machining in the third embodiment is applicable to the inner surface Ci of the first half case body Cb1 in the first and second embodiments as well. In this case, in the inner surface Ci1 of the first half case body Cb1 in the first and second embodiments, the respective areas forming the top surfaces of the main guide weirs 50 and the respective areas forming rotating and sliding surfaces of the pinion gear support surfaces P1, P2 with respect to the pinion gears 22 are worked surfaces formed in the same spherical surface. Moreover, the respective areas forming the rotating and sliding surfaces of the side gear support surfaces S1, S2 with respect to the side gears 23 are planar worked surfaces. Areas different from the aforementioned, that is, areas of the inner surface Ci surrounded by the main guide weirs 50, the pinion gear support surfaces P1, P2, and the side gear support surfaces S1, S2, and the pinion gear lubricating oil grooves Gp and the side gear lubricating oil grooves Gs are unworked surfaces that are positioned lower (that is, toward a radially outer side) than the above-described worked surfaces.

Other configurations in the third embodiment are basically the same as those in the first embodiment. Thus, constituent elements in the third embodiment are labelled with the same reference numerals used for the corresponding constituent elements in the first embodiment, and detailed description of configurations of these constituent elements will be omitted. The third embodiment can also achieve operation effects that are basically the same as those of the first embodiment.

Figure 9C:
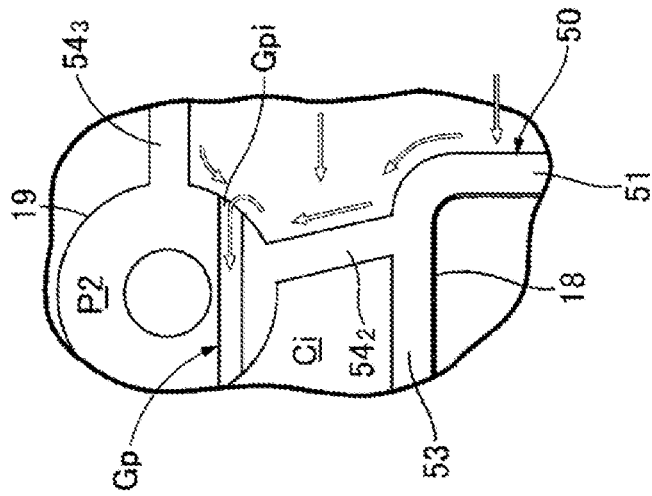
FIG. 9C is a schematic diagram of the modified example of the auxiliary weir as seen radially from the center of the differential case, the schematic diagram illustrating a third modified example in which an auxiliary weir axially extending from an outer circumference of a pinion gear support surface is added in the second modified example.
Figure 9B:
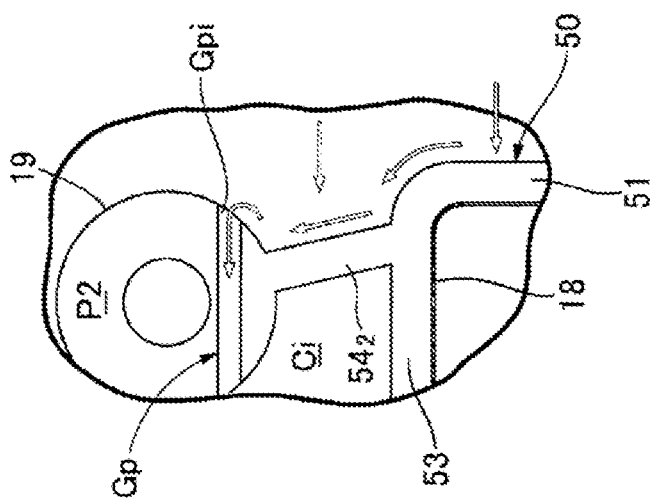
FIG. 9B is a schematic diagram of the modified example of the auxiliary weir as seen radially from the center of the differential case, the schematic diagram illustrating a second modified example in which the auxiliary weir extends in a rotating direction of the differential case to thereby be coupled to the main guide weir in a configuration in which a pinion gear lubricating oil groove is arranged in the same direction as in the third embodiment.
Figure 9A:
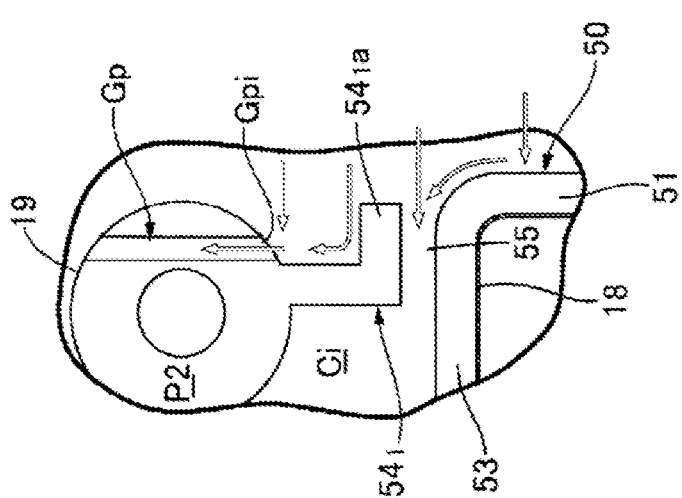
FIG. 9A is a schematic diagram of a modified example of an auxiliary weir as seen radially from the center of the differential case, the schematic diagram illustrating a first modified example of the auxiliary weir that is separated from a main guide weir.

Furthermore, FIGS. 9A, 9B, 9C illustrate a modified example of the auxiliary weir 54 illustrated in the second embodiment by way of example, as a schematic view seen radially from the center of the differential case C.

Specifically, in a first modified example illustrated in FIG. 9A, an auxiliary weir $54_1$ extends from a part of the circumference of the support base 19, closer to the second side gear support surface S2 with respect to the opened part Gpi of the pinion gear lubricating oil groove Gp in the axial direction, toward the window 18 in the circumferential direction (that is, a direction along the rotating direction) of the differential case C. Moreover, the auxiliary weir $54_1$ has its extended end bent in the axial direction toward the first side gear support surface S1 into an L-shape, to thereby include a projection $54_1a$. There is a gap 55 between the projection $54_1a$ and the main guide weir 50. In the first modified example, between the opened part Gpi of the pinion gear lubricating oil groove Gp and the window 18 (in other words, a position displaced from the opened part Gpi in the circumferential direction described above), the auxiliary weir $54_1a$ can effectively capture the oil flowing in the axial direction with respect to first side gear support surface S1, to thereby effectively guide the same to the opened part Gpi. Accordingly, lubrication performance can be improved for the pinion gear support surfaces P1, P2.

In a second modified example illustrated in FIG. 9B, from a part of the outer circumference of the support base 19, closer to the second side gear support surface S2 with respect to the opened part Gpi of the pinion gear lubricating oil groove Gp in the axial direction, an auxiliary weir $54_2$ extends in the above-described circumferential direction of the differential case C toward the window 18 in a manner to slightly tilt toward the first side gear support surface S1. Moreover, the auxiliary weir $54_2$ has its extended end connected to the main guide weir 50. In the second modified example, a part of the main guide weir 50 (the first weir 51) extends in a manner to be continuous to the auxiliary weir $54_2$, to thereby function as an auxiliary weir. Thus, the first weir can effectively capture the oil flowing from the first side gear support surface S1 toward the window 18 in the axial direction, to thereby effectively guide the same to the opened part Gpi. Accordingly, the lubrication performance can be improved for the pinion gear support surfaces P1, P2.

In a third modified example illustrated in FIG. 9C, another auxiliary weir $54_3$ is added to the second modified example of FIG. 9B. The auxiliary weir $54_3$ extends toward the first side gear support surface S1 in the axial direction from the circumference of the support base 19 at a position opposite to the auxiliary weir $54_2$ across the opened part Gpi. In the third modified example, the auxiliary weir $54_3$ extending in the axial direction effectively captures the oil flowing along the auxiliary weir $54_2$ but merely passing through the opened part Gpi without being introduced therein and/or the oil flowing in the circumferential direction at a position slightly distanced from the auxiliary weir $54_2$ in the axial direction, to thereby introduce the same to the opened part Gpi. Accordingly, the lubrication performance can be improved for the pinion gear support surfaces P1, P2.

Although the embodiments and their modified examples of the present invention have been described hereinabove, the present invention is not limited to the embodiments and modified examples, and the design of the invention can be variously changed within a scope not departing from the spirit of the invention.

For example, the embodiments described above show that the differential device D is implemented in a differential device for an automobile. Alternatively, in the present invention, the differential device D may be implemented in vehicles different from automobiles and/or various mechanical devices different from vehicles.

Figure 4A:
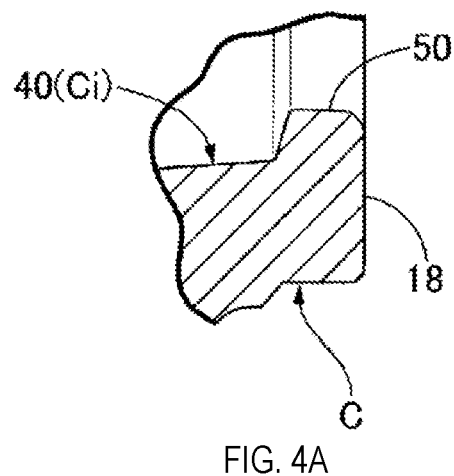
FIG. 4A is an enlarged sectional view along a line 4A-4A in FIG. 1.
Figure 4B:
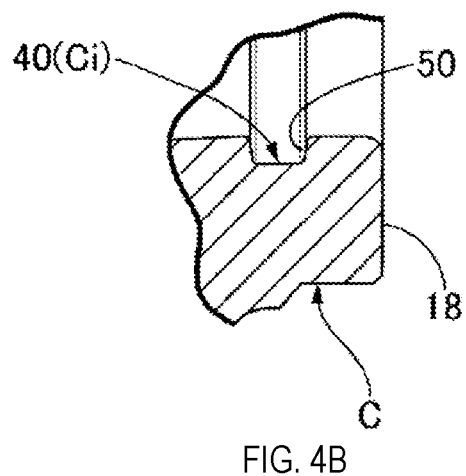
FIG. 4B is the same sectional view as FIG. 4A illustrating a first modified example of an oil introduction part.
Figure 4C:
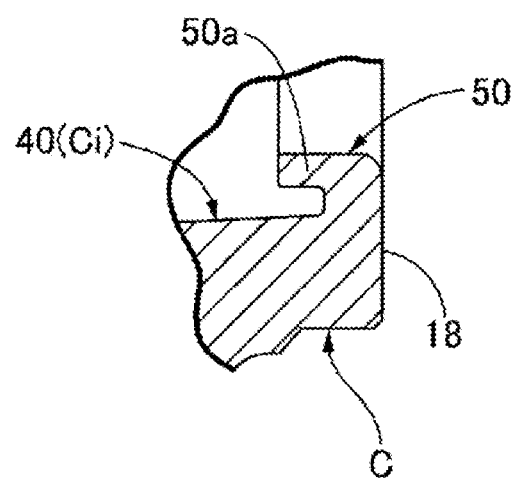
FIG. 4C is the same sectional view as FIG. 4A illustrating a second modified example of an oil introduction part.

The above-described embodiments show, by way of example as schematically illustrated in FIG. 4A, the main guide weir 50 protruding from the inner surface Ci of the differential case C radially inwardly (toward the first axial line X1) as the oil guiding part to guide the oil such that the oil deviates from a flow direction from the side gear support surfaces S1, S2 to the window along the inner surface of the differential case and flows around the window. Alternatively, at least a part of the oil guiding part may include, as illustrated in FIG. 4B, an inner wall of a groove, adjacent to the window 18, provided in the inner surface Ci of the differential case C. In this case, some of the oil flowing toward the window 18 flows around and is accumulated in the inner wall of the groove adjacent to the window 18, so that there is an increased amount of oil kept in the inner surface Ci of the differential case C. Accordingly, outflow of the oil through the window 18 can be suppressed. Alternatively, as illustrated in FIG. 4C, a part of the oil guiding part may be served as the protrusion 50a that protrudes opposite to the window 18 and is integrally continuous to the weir 50 provided in a protruding manner to the inner surface Ci of the differential case C. In this case, an improved effect of damming up the oil flowing toward the window 18 is exhibited.

The above-described embodiments show, as an example of the oil introduction channel to introduce the oil from outside the differential case C to the side gear support surfaces S1, S2, (i) the helical grooves 15, 16, respectively, (first and second embodiments) that are provided in the inner circumferential surfaces of the first and second bearing bosses Cb1, Cb2 of the differential case C and that can exhibit a pumping action, and/or (ii) the clearance 30 (third embodiment) provided to fitting parts between the bearing bosses Cb1, Cb2 and the output shafts 11, 12. However, the oil introduction channel is not limited to the embodiments, and may be, for example, a straight line groove provided in the inner circumferential surface of each of the bearing bosses Cb1, Cb2.

The above-described embodiments show that both sides in the axial direction of the differential case C are provided with the bearing bosses Cb1, Cb2 as boss parts in a continuous manner, and both the bearing bosses Cb1, Cb2 are provided with the oil introduction channels (the helical grooves 15, 16 or the clearance 30). Alternatively, in the present invention, one introduction channel may be provided to only a bearing boss on one side of the differential case C in the axial direction. Alternatively, one bearing boss may be provided as a boss part in a continuous manner to a side part of the differential case C on one side of the differential case C in the axial direction, and the one bearing boss may be provided with an oil introduction channel.

In the above-described embodiments, the height of the main guide weir 50 and/or the auxiliary weirs 54, $54_1$ to $54_3$ (that is, the height of protrusion from the inner surface Ci of the differential case C toward a radially inner side (toward the first axial line X1)) may be substantially the same or partly different (difference in height) in the whole longitudinal range. If the latter is the case, a weir corresponding to a part of the differential case C to receive the most intense centrifugal force during rotation of the differential case C may be particularly set to be high.

The main guide weir 50 as the oil guiding part may not necessarily be arranged in all the areas in the inner surface Ci of the differential case C when there are multiple areas between the pinion gear support surfaces P1, P2 and the windows 18 and multiple areas between the side gear support surfaces S1, S2 and the windows 18. For example, when one oil introduction channel (helical groove 15, 16, or the clearance 30) is provided to only the bearing boss Cb1 on one side in the axial direction of the differential case C or the bearing boss Cb2 on the other side in the axial direction, the main guide weir 50 (particularly, the first and second weirs 51, 52) may be provided only between the first side gear support surface S1 or the second side gear support surface S2, on the same side as the oil introduction channel, and the window 18. Alternatively, the main guide weir 50 (particularly, the third weir 53) may be provided only between the first pinion gear support surface P1 or the second pinion gear support surface P2, in a rear side in the rotating direction of the differential case C about the window 18 during the automobile traveling forwards, and the window 18.

Furthermore, the main guide weir 50 (particularly, the first and second weirs 51, 52) situated in a range between the side gear support surfaces S1, S2 and the circumferential rim of the corresponding one window 18 in the axial direction does not necessarily covers the entire circumferential rim of the corresponding one window 18 in the circumferential direction in the aforementioned range. For example, as in the first and second weirs 61, 62 in the third embodiment (see, FIGS. 7 and 8), partly covering the above-described circumferential rim in the circumferential direction can suppress outflow of the oil through the corresponding one window 18 to some extent.

Still further, the main guide weir 50 and the auxiliary weirs 54, 54$_1$ to 54$_3$ may be continuous to each other as in the second embodiment (see, FIGS. 5, 6) and the second and third modified examples of the second embodiment (see, FIGS. B, C) or may be separated with the gap 55 interposed as in the first modified example (see, FIG. 9A).

In the first and third embodiments, the first weirs 51, 61 and the second weirs 52, 62 in the main guide weir 50 are continuous weirs. Alternatively, the first weirs 51, 61 and the second weirs 52, 62 may be separated.

The first and second embodiments describe the diameter-enlarged inner surface part 40 of the differential case C as a part including (i) the first diameter-enlarged inner surface part 41 including the steeply-enlarged inner surface part 41a and the gently-enlarged inner surface part 41b and (ii) the second diameter-enlarged inner surface part 42 consisting of the steeply-enlarged inner surface part alone. Moreover, the recessed surface configuration including the joining part between the steeply-enlarged inner surface part 41a and the second diameter-enlarged inner surface part 42 and its peripheral part is provided as the inner surface bottom part 40o to gather the oil. In the present invention (particularly, the first to third features), the diameter enlarged configuration of the diameter-enlarged inner surface part 40 of the differential case C is not limited to the first and second embodiments.

For example, an area(s) of the gently enlarged inner surface part 41b and/or the steeply-enlarged inner surface part 41a may be formed in a cylindrical surface (that is, having a constant inner diameter in the whole axial range). Alternatively, only the area of the second diameter-enlarged inner surface part 42 may be formed in the cylindrical surface. In these cases, the cylindrical surface is the inner surface recessed part 40o. Alternatively, at least a partial area of the gently-enlarged inner surface part 41b may be formed in a recessed surface having the largest diameter in its axial center and having a V-shape in a lateral section, while the areas of the steeply-enlarged inner surface part 41a and the second diameter-enlarged inner surface part 42 are formed in the cylindrical surface. In this case, a depression in the V-shaped recessed surface is the inner surface recessed part 40o. Alternatively, the diameter-enlarged inner surface part 40 may have an inner diameter gradually increasing (i) from one end of the diameter-enlarged inner surface part 40 in the axial direction toward a center part or a specific intermediate part displaced from the center part and (ii) from the other end in the axial direction toward the center part or the specific intermediate part, to thereby be formed in a recessed surface having the largest diameter in the center part in the axial direction or the specific intermediate part and having a V-shape in a lateral section. In this case, a depression of the V-shape recessed surface is inner surface recessed part 40o.

The invention claimed is:
1. A differential device comprising:
a differential case;
side gears in pairs;
two or more pinion gears;
pinion gear support surfaces;
a boss part;
an oil introduction channel; and
a window,
the differential case being rotatable about a first axial line,
the side gears in pairs being supported by the differential case in a freely rotatable manner about the first axial line,
the two or more pinion gears being configured to (i) be supported by the differential case in a freely rotatable manner about at least one second axial line orthogonal to the first axial line and (ii) mesh with the respective side gears in pairs,
the pinion gear support surfaces being provided in an inner surface of the differential case and supporting back sides of the respective two or more pinion gears such that the two or more pinion gears freely rotate,
the boss part being provided to a side part of the differential case in a protruding manner, the side part being located on at least one side of the differential case in an axial direction, and the axial direction being a direction along the first axial line,
the oil introduction channel being provided to the boss part, the oil introduction channel being configured to introduce lubricating oil from an outside of the differential case to a corresponding one side gear support surface of side gear support surfaces in the inner surface of the differential case, the corresponding one side gear support surface being configured to support a back side of a corresponding one side gear of the side gears such that the corresponding one side gear freely rotates, and the corresponding one side gear being located on the same side of the differential case as the boss part,
the window being formed in the differential case so as to make an inside and the outside of the differential case communicate with each other, and
the inner surface of the differential case including main guide weirs, part, the oil guiding part being located between, in th the main guide weirs protruding from the inner surface toward the first axial line and enclosing an entire circumference of the window so as to guide at least some of oil such that the at least some of the oil deviates from a flow direction from the corresponding one side gear support surface to the window along the inner surface and flows around the window, the main guide weirs including a first weir, a second weir and a third weir, the main guide weirs is configured such that the first weir located between the corresponding one side gear support surface and a circumferential rim of the window, the second weir located between a corresponding other side gear support surface and the circumferential rim of the window, and the third weir located between a corresponding one pinion gear support surface of the pinion gear support surfaces and the circumferential rim of the window are integrally connected to each other.

2. The differential device according to claim 1,
wherein a pinion gear lubricating oil groove is recessively provided in the corresponding one pinion gear support surface, and
wherein the pinion gear lubricating oil groove is open to the inner surface of the differential case at an outer circumference of the corresponding one pinion gear support surface.

3. The differential device according to claim 2,
wherein the inner surface of the differential case includes an oil accumulating part between the corresponding one side gear support surface and the main guide weirs, the oil accumulating part being an inner surface bottom part, a diameter of which is enlarged toward a direction away from the first axial line.

4. The differential device according to claim 1,
wherein the inner surface of the differential case includes an oil accumulating part between the corresponding one side gear support surface and the main guide weirs, the oil accumulating part being an inner surface bottom part, a diameter of which is enlarged toward a direction away from the first axial line.

5. A differential device comprising:
a differential case;
side gears in pairs;
two or more pinion gears;
pinion gear support surfaces;
a boss part;
an oil introduction channel; and
a window,
the differential case being rotatable about a first axial line,
the side gears in pairs being supported by the differential case in a freely rotatable manner about the first axial line,
the two or more pinion gears being configured to (i) be supported by the differential case in a freely rotatable manner about at least one second axial line orthogonal to the first axial line and (ii) mesh with the respective side gears in pairs,
the pinion gear support surfaces being provided in an inner surface of the differential case and supporting back sides of the respective two or more pinion gears such that the two or more pinion gears freely rotate,
the boss part being provided to a side part of the differential case in a protruding manner, the side part being located on at least one side of the differential case in an axial direction, and the axial direction being a direction along the first axial line,
the oil introduction channel being provided to the boss part, the oil introduction channel being configured to introduce lubricating oil from an outside of the differential case to a corresponding one side gear support surface of side gear support surfaces in the inner surface of the differential case, the corresponding one side gear support surface being configured to support a back side of a corresponding one side gear of the side gears such that the corresponding one side gear freely rotates, and the corresponding one side gear being located on the same side of the differential case as the boss part,
the window being formed in the differential case so as to make an inside and the outside of the differential case communicate with each other,
the pinion gear support surfaces being formed on corresponding support bases provided in a protruding manner to the inner surface of the differential case, and
the inner surface of the differential case including:
main guide weirs enclosing an entire circumference of the window so as to guide at least some of oil such that the at least some of the oil deviates from a flow direction from the corresponding one side gear support surface to the window along the inner surface and flows around the window, and protruding from the inner surface toward the first axial line, the main guide weirs including a first weir located between the corresponding one side gear support surface and a circumferential rim of the window, and a second weir located between a corresponding other side gear support surface and the circumferential rim of the window; and
an auxiliary weir extending from a part of an outer circumference of a corresponding one support base of the support bases toward the main guide weirs.

6. The differential device according to claim 5,
wherein a pinion gear lubricating oil groove is recessively provided in a corresponding one pinion gear support surface of the pinion gear support surfaces, and
wherein the pinion gear lubricating oil groove is open to the inner surface of the differential case at an outer circumference of the corresponding one pinion gear support surface.

7. The differential device according to claim 6,
wherein the inner surface of the differential case includes an oil accumulating part between the corresponding one side gear support surface and the main guide weirs, the oil accumulating part being an inner surface bottom part, a diameter of which is enlarged toward a direction away from the first axial line.

8. The differential device according to claim 5,
wherein the inner surface of the differential case includes an oil accumulating part between the corresponding one side gear support surface and the main guide weirs, the oil accumulating part being an inner surface bottom part, a diameter of which is enlarged toward a direction away from the first axial line.

* * * * *